United States Patent
Vicino, Jr.

(10) Patent No.: US 10,205,186 B2
(45) Date of Patent: Feb. 12, 2019

(54) FUEL CELL ELECTRODE ASSEMBLY

(75) Inventor: Thomas F. Vicino, Jr., Marlborough, CT (US)

(73) Assignee: Audi AG, Ingolstadt (DE)

( * ) Notice: Subject to any disclaimer, the term of this patent is extended or adjusted under 35 U.S.C. 154(b) by 454 days.

(21) Appl. No.: 14/413,410

(22) PCT Filed: Jul. 10, 2012

(86) PCT No.: PCT/US2012/046042
§ 371 (c)(1),
(2), (4) Date: Jan. 7, 2015

(87) PCT Pub. No.: WO2014/011153
PCT Pub. Date: Jan. 16, 2014

(65) Prior Publication Data
US 2015/0171452 A1   Jun. 18, 2015

(51) Int. Cl.
*H01M 8/028* (2016.01)
*H01M 8/1004* (2016.01)
(Continued)

(52) U.S. Cl.
CPC ......... *H01M 8/1004* (2013.01); *H01M 8/023* (2013.01); *H01M 8/0284* (2013.01);
(Continued)

(58) Field of Classification Search
CPC .. H01M 8/0284; H01M 8/028; H01M 8/0276; H01M 8/0282
See application file for complete search history.

(56) References Cited

U.S. PATENT DOCUMENTS

2005/0089746 A1   4/2005 James et al.
2005/0100776 A1   5/2005 Brunk et al.
(Continued)

FOREIGN PATENT DOCUMENTS

EP   1 601 036 A1   11/2005
EP   1 729 361 A2   12/2006
(Continued)

OTHER PUBLICATIONS

Extended European Search Report and Written Opinion, dated Jan. 25, 2016, for corresponding European Application No. 12 88 1101, 8 pages.
(Continued)

*Primary Examiner* — Jeremiah R Smith
(74) *Attorney, Agent, or Firm* — Seed IP Law Group LLP

(57) ABSTRACT

An exemplary fuel cell electrode assembly includes a membrane. A first electrode is on the first side of the membrane. A second electrode is on a second side of the membrane. A first gas diffusion layer is adjacent the first electrode. At least a portion of the first gas diffusion layer is at least partially impregnated by a first plastic material that bonds the portion of the first gas diffusion layer to the first electrode. A second gas diffusion layer is adjacent the second electrode. At least a portion of the second gas diffusion layer is at least partially impregnated by a second plastic material that bonds the second gas diffusion layer to the second electrode. A third plastic material is between at least one of the gas diffusion layers and the adjacent electrode for electrically isolating the first gas diffusion layer from the second gas diffusion layer.

22 Claims, 2 Drawing Sheets

(51) Int. Cl.
*H01M 8/023* (2016.01)
*H01M 8/0284* (2016.01)
*H01M 8/0286* (2016.01)
*H01M 8/0276* (2016.01)
*H01M 8/0282* (2016.01)
*H01M 8/1018* (2016.01)

(52) U.S. Cl.
CPC .......... *H01M 8/0286* (2013.01); *H01M 8/028* (2013.01); *H01M 8/0276* (2013.01); *H01M 8/0282* (2013.01); *H01M 2008/1095* (2013.01)

(56) References Cited

U.S. PATENT DOCUMENTS

2007/0190400 A1    8/2007   Buche et al.
2009/0087713 A1    4/2009   Yoshida et al.
2011/0281195 A1   11/2011   Fuller et al.

FOREIGN PATENT DOCUMENTS

| | | |
|---|---|---|
| JP | 2001-351651 A | 12/2001 |
| JP | 2002-529890 A | 9/2002 |
| JP | 2003-068332 A | 3/2003 |
| JP | 2004-523060 A | 7/2004 |
| JP | 2007-504614 A | 3/2007 |
| JP | 2008-071542 A | 3/2008 |
| JP | 2009-206075 A | 9/2009 |
| WO | 00/26975 A1 | 5/2000 |
| WO | 02/089240 A1 | 11/2002 |
| WO | 2005/035247 A2 | 4/2005 |
| WO | 2008/072550 A1 | 6/2008 |

OTHER PUBLICATIONS

PCT International Search Report dated Mar. 29, 2013 for PCT Application No. PCT/US2012/046042 (2 pages).

FUEL CELL ELECTRODE ASSEMBLY

BACKGROUND

Fuel cells are useful for generating electricity. Fuel cells facilitate an electrochemical reaction between reactants such as hydrogen and oxygen. There are various components within a fuel cell including an electrode assembly.

Example electrode assemblies include a membrane with electrodes on both sides of the membrane. One of the electrodes serves as a cathode and the other serves as an anode. In some fuel cell designs, a gas diffusion layer is provided between the electrodes and a reactant distribution plate that facilitates directing the reactants toward the membrane.

There are various challenges associated with assembling fuel cells including achieving appropriate alignment of the various components within the fuel cell. Typical assembly procedures are relatively time-consuming, labor-intensive and, therefore, tend to introduce additional cost.

SUMMARY

An exemplary fuel cell electrode assembly includes a membrane. A first electrode is on the first side of the membrane. A second electrode is on a second side of the membrane. A first gas diffusion layer is adjacent the first electrode. At least a portion of the first gas diffusion layer is at least partially impregnated by a first plastic material that bonds the portion of the first gas diffusion layer to the first electrode. A second gas diffusion layer is adjacent the second electrode. At least a portion of the second gas diffusion layer is at least partially impregnated by a second plastic material that bonds the second gas diffusion layer to the second electrode. A third plastic material is between at least one of the gas diffusion layers and the adjacent electrode for electrically isolating the first gas diffusion layer from the second gas diffusion layer.

An exemplary method of making a fuel cell electrode assembly includes situating a first plastic material between a first gas diffusion layer and a first electrode. A second plastic material is situated between a second gas diffusion layer and a second electrode. A third plastic material is situated between the second gas diffusion layer and the second electrode. The first plastic material is melted so that the first plastic material at least partially impregnates a portion of the first gas diffusion layer. The melted first plastic material also secures the first gas diffusion layer to the first electrode. The second plastic material is melted such that it at least partially impregnates a portion of the second gas diffusion layer. The second plastic material secures the second gas diffusion layer to the second electrode with the third plastic material between the second electrode and the second gas diffusion layer for electrically isolating the second gas diffusion layer from the first gas diffusion layer.

The various features and advantages of a disclosed example embodiment will become apparent to those skilled in the art from the following detailed description. The drawings that accompany the detailed description can be briefly described as follows.

DETAILED DESCRIPTION

Figure 1:
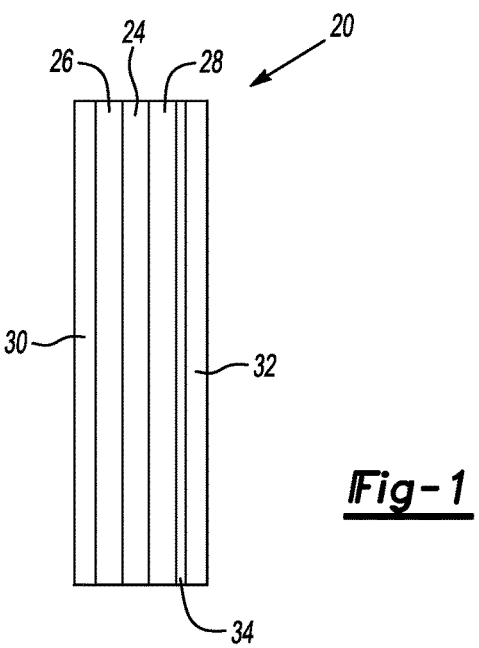
FIG. 1 schematically illustrates an example electrode assembly designed according to an embodiment of this invention.

FIG. 1 schematically shows a fuel cell electrode assembly 20, which is considered a unitized electrode assembly (UEA). The illustrated UEA 20 includes a membrane 24, a first electrode 26 on one side of the membrane 24 and a second electrode 28 on an opposite side of the membrane 24. One of the electrodes 26, 28 is configured to serve as an anode electrode while the other electrode 26, 28 is configured to serve as a cathode electrode.

A first gas diffusion layer 30 is adjacent the first electrode 26 and secured to the first electrode 26 at least along an outer periphery of the first gas diffusion layer 30. A second gas diffusion layer 32 is secured adjacent the second electrode 28 at least along an outer periphery of the second gas diffusion layer 32. An electrically isolating plastic layer 34 is situated between the second gas diffusion layer 32 and the second electrode 28. The electrically isolating plastic layer 34 electrically isolates the first gas diffusion layer 30 from the second gas diffusion layer 32. The layer 34 prevents any fibers of a gas diffusion layer from penetrating the UEA 22 and contacting the other gas diffusion layer.

Figure 2:
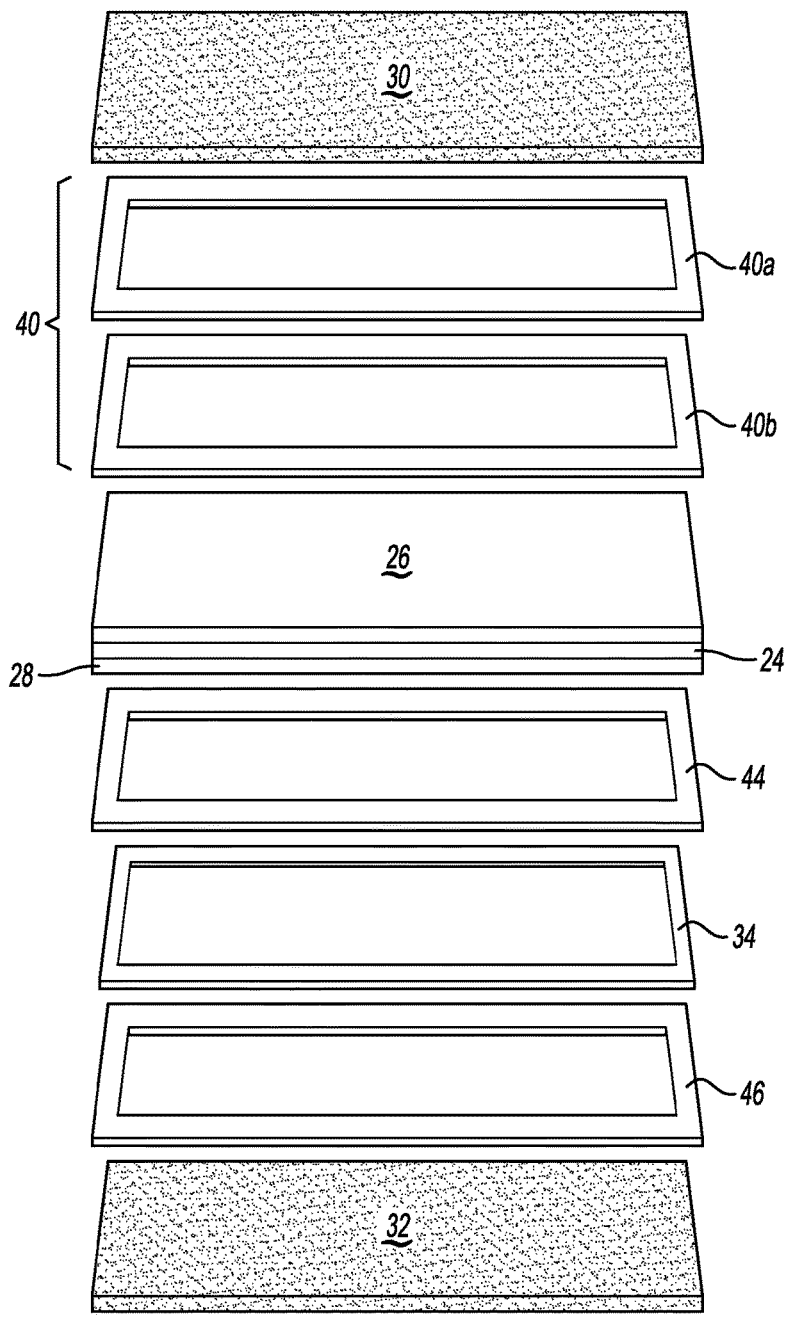
FIG. 2 illustrates a plurality of layers used during a process of making an electrode assembly like the example of FIG. 1.

FIG. 2 schematically illustrates a plurality of layers that are used for making the example electrode assembly 20. A first plastic material layer 40 is situated between the first gas diffusion layer 30 and the first electrode 26. In this example, the first plastic material layer 40 comprises two plastic films 40A and 40B. It is also possible to use a single plastic film of the first plastic material. As can be appreciated from the illustration, the plastic films 40A and 40B have a width along four sides of a generally rectangular periphery that corresponds to a border around the periphery of the first gas diffusion layer 30.

At least one layer of film comprising a second plastic material is situated between the second gas diffusion layer 32 and the second electrode 28. In this example, the layer of second plastic material includes two film layers 44 and 46. The film layer 44 is situated immediately adjacent the second electrode 28 and the film layer 46 is situated immediately adjacent the second gas diffusion layer 32.

The electrically isolating plastic layer 34 in this example comprises a third plastic material. A film of the third plastic material is situated between the plastic films 44 and 46 in this example. The plastic film 44 facilitates bonding the third plastic material 34 to the second electrode 28. The plastic films 46 and 44 at least partially impregnate the outer periphery of the second gas diffusion layer 32 and facilitate bonding the second gas diffusion layer 32 to the second electrode 28.

Figure 3:
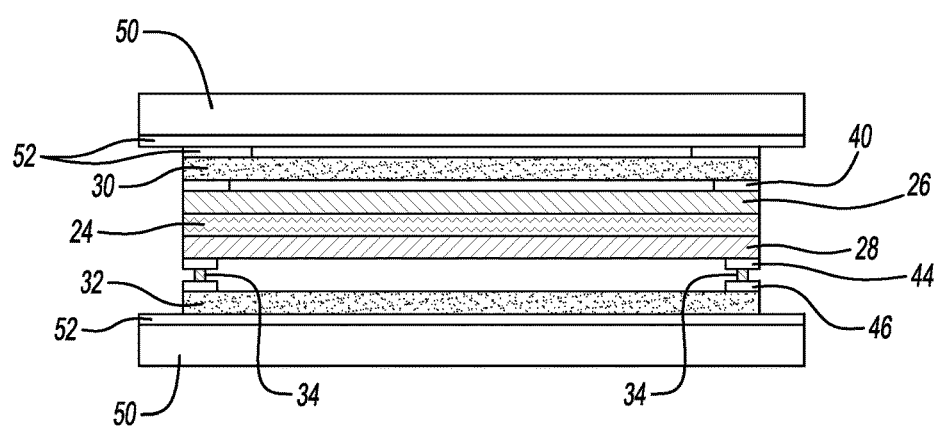
FIG. 3 schematically illustrates a portion of a process of making an example electrode assembly.

FIG. 3 schematically illustrates a press 50 comprising opposed press plates. Release film layers 52 are situated between the press plates and the gas diffusion layers 30 and 32, respectively. The release film layers 52 facilitate removing the completed electrode assembly from the press 50 when the assembly process is complete.

In the example of FIG. 3, the first plastic material is shown as a single layer or film 40, which may comprise more than one film as schematically shown in FIG. 2.

FIG. 3 shows respective widths of the various plastic film layers although they are not necessarily shown to scale. As can be appreciated from FIGS. 2 and 3, a width of the generally linear segments of the film layer 34 comprising the third plastic material is smaller than a width of the segments of the film layers 44 and 46 of the second plastic material. The smaller width of the layer 34 of the third plastic material facilitates the third plastic material being at least partially encapsulated within the second plastic material as a result of the assembly process. As can be appreciated from FIG. 4, once the second plastic material has been melted, it at least partially impregnates the portion 64 of the second gas diffusion layer 32, provides a bonding layer between the second electrode 28 and the layer 34 of the third plastic material and at least partially encapsulates the third plastic material 34. Having the second plastic material in such a configuration at the end of the assembly process ensures a fluid-tight seal at the interface around the periphery of the second gas diffusion layer 32 and the second electrode 28 even with the third plastic material 34 between the second electrode 28 and the second gas diffusion layer 32.

As can be appreciated from FIG. 3, the gas diffusion layers, plastic materials and the electrodes are layered such that the first plastic material layer 40 is situated against the first gas diffusion layer, the first electrode 26 is situated against the first plastic material layer 40, the layer 44 of the second plastic material is situated against the second electrode 28, the layer 34 of the third plastic material is situated against the layer 44 of the second plastic material, the layer 46 of the second plastic material is situated against the layer 34 of the third plastic material and the second gas diffusion layer 32 is situated against the layer 46 of the second plastic material. All of those layers are situated within the press 50. In some examples, each individual layer is placed into the press to establish the order of the different layers shown in FIG. 3. In other examples, the individual layers are situated together in a layered arrangement and the entire layered arrangement is then placed into the press 50.

Once all of the layers are properly situated within the press 50, a first pressing force is applied in a direction that urges the pressing plates toward each other. In one example, the first pressing force is approximately 1,500 pounds. All of the layers within the press 50 are heated until they reach a first selected temperature. In one example, the first selected temperature is approximately 240° F. With the contents of the press 50 at the first selected temperature, a second pressing force is applied. The second pressing force in one example is approximately 7,000 pounds.

The second pressing force is applied for a selected amount of time, such as five minutes in one example, while continuing to heat the contents within the press 50. In one example, the various layers of the electrode assembly reach a temperature of approximately 250° F. while the second pressing force is applied. After the selected amount of time has lapsed, the heating stops and the contents within the press 50 are cooled. The second pressing force is applied during the cooling portion of the assembly process. In one example, the contents within the press 50 are cooled until they reach a temperature that is less than 110° F. before the second pressing force is released.

After releasing the second pressing force, the press 50 is opened and the completed electrode assembly 20 may be removed.

Figure 4:
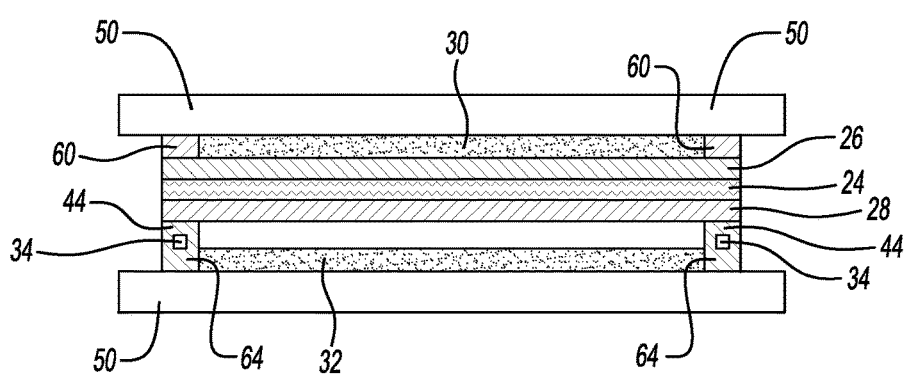
FIG. 4 schematically illustrates another portion of the example process.

As can be appreciated from FIG. 4, heating the contents of the press 50 is sufficient to melt the first plastic material such that it at least partially impregnates a portion 60 of the first gas diffusion layer 30. The same temperature is sufficient to at least partially melt the second plastic material such that it at least partially impregnates a portion 64 of the second gas diffusion layer 32. In one example, the first plastic material and the second plastic material are the same. One example includes a low density polyethylene as the first plastic material and the second plastic material. In some examples, the first plastic material and the second plastic material may be different provided that they each have a melting temperature that is sufficiently low so that both plastic materials will be at least partially melted sufficient to impregnate the portions of the respective gas diffusion layers and to secure those portions to the adjacent electrodes.

The melting temperature of the third plastic material of the layer 34 is higher than the melting temperature of the first and second plastic materials. This higher melting temperature prevents the layer 34 of the third plastic material from melting during the assembly process. In one example, the third material at least partially softens when exposed to the temperature used for melting the first and second plastic materials. FIG. 4 schematically shows the plastic layer 34 generally retaining the same shape it had prior to the heating and application of a pressing force. The arrangement in FIG. 4 is not necessarily shown to scale, but rather is intended to show the relationship between the various plastic materials and the layers of the electrode assembly. In one example, the third plastic material comprises a linear low density polyethylene that is effective for electrically isolating the first gas diffusion layer 30 from the second gas diffusion layer 32.

One feature of the disclosed example is that it allows for assembling the electrode assembly 20 during a single bonding process. The bonds that secure the gas diffusion layers to the respective electrodes are established during the single process within the press 50. The same process allows for establishing the plastic-impregnated portions on the gas diffusion layers for establishing a fluid-tight seal at the interface between those portions and the respective electrodes. At the same time, the plastic-impregnated periphery of the gas diffusion layers comprise a barrier that resists fluid movement across the edges of the gas diffusion layer in a direction parallel to a plane of the gas diffusion layer (e.g., to the right or left in FIGS. 3 and 4).

Being able to use a single process within a press for establishing the various seals and securing the various layers together of the electrode assembly 20 reduces assembly time, labor and expense. Therefore, the disclosed examples provides enhanced economies compared to multi-stage assembly processes for making fuel cell electrode assemblies.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:
1. A fuel cell electrode assembly, comprising
a membrane that includes outer edges that define an outer periphery of the membrane;
a first electrode on a first side of the membrane;
a second electrode on a second side of the membrane;
a first gas diffusion layer adjacent the first electrode, at least a portion of the first gas diffusion layer being at least partially impregnated by a first plastic material that bonds the portion of the first gas diffusion layer to the first electrode;

a second gas diffusion layer adjacent the second electrode, at least a portion of the second gas diffusion layer being at least partially impregnated by a second plastic material that bonds the second gas diffusion layer to the second electrode; and a third plastic material between at least one of the gas diffusion layers and the adjacent electrode for electrically isolating the first gas diffusion layer from the second gas diffusion layer, the third plastic material embedded in the second plastic material such that at least a portion of the second plastic material is situated between the third plastic material and the adjacent electrode, the third plastic material having a width that is smaller than a width of the second plastic material and having outer edges that define an outer periphery of the third plastic material, the outer edges of the membrane being offset outwardly beyond the outer edges of the third plastic material.

2. The fuel cell electrode assembly of claim 1, wherein the third plastic material is different than the first and second plastic materials.

3. The fuel cell electrode assembly of claim 2, wherein
the first and second plastic materials have a melting temperature; and
the third plastic material has a melting temperature that is higher than the melting temperature of the first and second plastic materials.

4. The fuel cell electrode assembly of claim 2, wherein
the first and second plastic materials comprise a low density polyethylene; and
the third plastic material comprises a linear low density polyethylene.

5. The fuel cell electrode assembly of claim 1, wherein the third plastic material is fully encapsulated in the second plastic material.

6. The fuel cell electrode assembly of claim 5 wherein an outer lateral edge of the second plastic material is coextensive with an outer lateral edge of the membrane.

7. The fuel cell electrode assembly of claim 1, wherein
the third plastic material is between the second gas diffusion layer and the second electrode;
the portion of the second gas diffusion layer, which is at least partially impregnated by the second plastic material, has a width in a direction along a plane of the second gas diffusion layer; and
the third plastic material has a width in the direction that is less than the width of the portion of the second gas diffusion layer.

8. The fuel cell electrode assembly of claim 1, wherein
the first plastic material seals an interface between the first electrode and the portion of the first gas diffusion layer;
the first plastic material establishes a barrier along an outer periphery of the first gas diffusion layer for resisting fluid movement across the outer periphery of the first gas diffusion layer;
the second plastic material seals an interface between the second electrode and the portion of the second gas diffusion layer; and
the second plastic material establishes a barrier along an outer periphery of the second gas diffusion layer for resisting fluid movement across the outer periphery of the second gas diffusion layer.

9. A fuel cell electrode assembly, comprising:
a membrane that includes outer edges that define an outer periphery of the membrane;
a pair of opposing electrodes, each electrode positioned on a respective side of the membrane;

a pair of opposing gas diffusion layers, each gas diffusion layer positioned adjacent a respective one of the electrodes on a side opposite of the membrane,
wherein each gas diffusion layer is at least partially impregnated by a respective bonding structure to bond the gas diffusion layer to the respective one of the electrodes, and
wherein at least one of the bonding structures comprises a frame of plastic material that is fully encapsulated by other plastic material such that the frame of plastic material is isolated from the electrode by the other plastic material, the frame of plastic material including outer edges that define an outer periphery of the frame, and
wherein the outer edges of the membrane are offset outwardly beyond the outer edges of the frame.

10. The fuel cell electrode assembly of claim 9, wherein the frame of plastic material has a width smaller than a width of the other plastic material that fully encapsulates the frame of plastic material.

11. The fuel cell electrode assembly of claim 9, wherein an outer lateral end of the other plastic material is coplanar with an outer lateral end of the membrane.

12. A method of making a fuel cell electrode assembly, comprising:
situating a first plastic material between a first gas diffusion layer and a first electrode;
situating a second plastic material between a second gas diffusion layer and a second electrode;
situating a membrane between the first gas diffusion layer and the second gas diffusion layer, the membrane having outer edges that define an outer periphery of the membrane;
situating a third plastic material between at least the second gas diffusion layer and the second electrode, the third plastic material having a width which is smaller than a width of the second plastic material and having outer edges that define an outer periphery of the third plastic material, the outer edges of the membrane being offset outwardly beyond the outer edges of the third plastic material;
melting the first plastic material such that the first plastic material at least partially impregnates a portion of the first gas diffusion layer and secures the first gas diffusion layer to the first electrode; and
melting the second plastic material such that the second plastic material at least partially impregnates a portion of the second gas diffusion layer and secures the second gas diffusion layer to the second electrode with the third plastic material between the second electrode and the second gas diffusion layer and embedded in the second plastic material for electrically isolating the second gas diffusion layer from the first gas diffusion layer, wherein at least a portion of the second plastic material is situated between the third plastic material and the second electrode.

13. The method of claim 12, comprising:
situating the plastic materials, the gas diffusion layers and the electrodes within a press;
applying a pressing force to at least the plastic materials and the gas diffusion layers within the press;
heating the plastic materials sufficiently to at least partially melt the first and second plastic materials while the plastic materials are subject to the pressing force; and cooling the plastic materials subsequent to the heating while the plastic materials are subject to the pressing force.

14. The method of claim 13, comprising heating the plastic materials to a temperature that is at least a melting temperature of the first and second plastic materials and less than a melting temperature of the third plastic material.

15. The method of claim 14, comprising softening the third plastic material without melting the third plastic material.

16. The method of claim 13, comprising
layering the gas diffusion layers, the plastic materials and the electrodes such that
at least one first film comprising the first plastic material is situated against the first gas diffusion layer;
the first electrode is situated against the first film;
at least one second film comprising the second plastic material is situated against the second electrode;
at least one third film comprising the third plastic material is situated against the second film, the at least one third film comprising the outer edges that define the outer periphery of the third plastic material;
at least one fourth film comprising the second plastic material is situated against the third film; and
the second gas diffusion layer is situated against the fourth film; and
placing the layered gas diffusion layers, the films and the electrodes in the press.

17. The method of claim 12, wherein the third plastic material is different than the first and second plastic materials.

18. The method of claim 17, wherein
the first and second plastic materials have a melting temperature; and
the third plastic material has a melting temperature that is higher than the melting temperature of the first and second plastic materials.

19. The method of claim 17, wherein
the first and second plastic materials comprise a low density polyethylene; and
the third plastic material comprises a linear low density polyethylene.

20. The method of claim 12, comprising fully encapsulating the third plastic material in the second plastic material.

21. The method of claim 12, wherein
the portion of the second gas diffusion layer, which is at least partially impregnated by the second plastic material, has a width in a direction along a plane of the second gas diffusion layer; and
the third plastic material has the width in the direction that is less than the width of the portion of the second gas diffusion layer.

22. The method of claim 12, comprising
sealing an interface between the first electrode and the portion of the first gas diffusion layer with the first plastic material;
establishing a barrier comprising the first plastic material along an outer periphery of the first gas diffusion layer for resisting fluid movement across the outer periphery of the first gas diffusion layer;
sealing an interface between the second electrode and the portion of the second gas diffusion layer with the second plastic material; and
establishing a barrier comprising the second plastic material along an outer periphery of the second gas diffusion layer for resisting fluid movement across the outer periphery of the second gas diffusion layer.

* * * * *